April 22, 1947.  J. W. TETER  2,419,470
PROCESS OF PREPARING AMINES AND NITRILES FROM OLEFINS AND AMMONIA
Filed Oct. 12, 1944
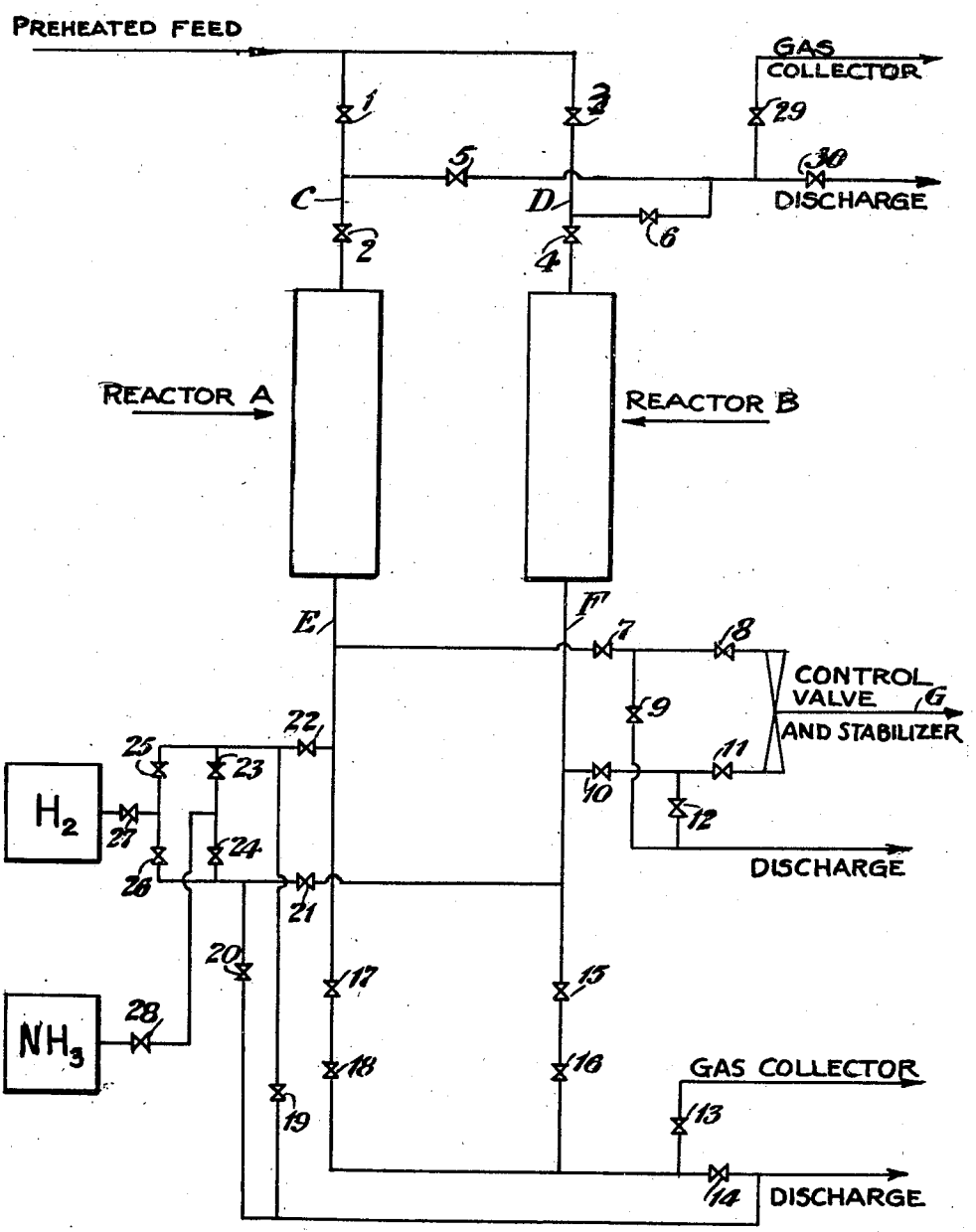
INVENTOR
John W Teter
BY
ATTORNEYS Patented Apr. 22, 1947

2,419,470

UNITED STATES PATENT OFFICE 2,419,470

PROCESS OF PREPARING AMINES AND NITRILES FROM OLEFINS AND AMMONIA

John W. Teter, Chicago, Ill., assignor to Sinclair Refining Company, New York, N. Y., a corporation of Maine Application October 12, 1944, Serial No. 558,484

2 Claims. (Cl. 260—464)

This invention relates to improvements in the production of nitrogen-containing organic compounds by the direct reaction of olefins and ammonia in the presence of a catalyst which selectively favors the combination of the olefins with ammonia, i. e. amination.

Processes for the production of nitrogen-containing products, largely nitriles but including amines and cyclic compounds such as pyridines, are described in applications Serial No. 289,186, filed August 9, 1939, Serial No. 440,094, filed May 22, 1942, and Serial No. 464,636, filed November 5, 1942. Catalysts which are particularly useful in this process include reduced metal oxides and, more particularly, cobalt. Useful catalyst are described in applications Serial No. 440,095, Serial No. 440,096 and Serial No. 440,097, filed May 22, 1942, and Serial No. 489,087, filed May 29, 1943.

In general, the direct amination process is carried out at high temperatures, for example, 400 to 725° F., or in some cases, even higher temperatures. High pressures, particularly with the lower olefins such as ethylene and proplyene, for example, 1500 to 3000 lbs. per square inch are advantageously used. The reaction is favored by the use of an excess of ammonia, and by the inclusion in the reaction mixture of a saturated hydrocarbon.

The amination reaction, by which is meant the reaction which results in the production of nitrogen-containing products, particularly nitriles and amines, is accompanied by side reactions, including cracking, polymerization, dehydrogenation, etc. In the course of the reaction, considerable quantities of tarry or carbonaceous material is formed. This deposits at least to some extent on the catalyst and impairs its efficiency. Introduction of hydrocarbon at high temperatures into the reaction zone, in the absence of ammonia, results in severe cracking, may cause such a drastic rise in temperature as to sinter the catalyst, and results in a deposit of coke or tar which greatly impairs the catalyst activity.

In any event, the activity of the catalyst on stream is maintained for only a limited period, which may be as short as 6 hours or even less, or may be somewhat more, for example, 10 hours. The catalyst activity may vary somewhat during this period, but with a good catalyst, adequate conversions are obtained for at least this length of time. After an on-stream period of about this length, the catalyst loses activity rapidly, with the result that either the degree of conversion becomes low or the proportion of desired products, that is, nitriles and amines as distinguished from polymer or tar, in the reaction product decreases to such an extent as to make the process less desirable economically than it should be.

The present invention provides improvements in this amination process by which the process is made substantially continuous, with the use of a fixed bed catalyst, and by which improved yields of the desired products, nitriles and amines, based on olefin consumed, are obtained with a minimum of losses and a maximum output from equipment with a given catalyst volume, by the provision of operating conditions which permit the process to be carried out with catalyst of maximum activity and a minimum of catalyst deterioration. By virtue of the substantially continuous production of reaction product of relatively uniform composition, recovery apparatus for separating the constituents of the reaction mixture and recovering them, for recycle or use, of maximum efficiency and minimum capital investment, may be used. The invention thus provides for the achievement of at least three economically important results, i. e., the use of a catalyst of uniformly high selective activity during substantially its entire on-stream periods, the prolongation of the total useful life of the catalyst, and the use of a minimum of accessory equipment, i. e., pumps, fractionation columns, ammonia recovery apparatus and the like, operated at high efficiencies.

In accordance with the present invention, the process is carried out by passing the gases through fixed catalyst beds, the catalyst advantageously being in the form of small pellets or other aggregates such as extruded products, consisting of the metals or reduced metal oxide supported on a suitable carrier, the whole being formed into pellets or the like of adequate strength. A minimum of two reactors are provided, substantially the same in construction, with the feed lines and take-off lines so arranged that one reactor may be on-stream, while the other is being treated to reactivate the catalyst, the periods of on-stream functioning and reactivation and the conditions of reactivation, being so selected that the feed of hydrocarbon and ammonia is continuous, and the draw-off of product is substantially continuous, with unitary feed and recovery apparatus only being required, while the catalyst is maintained at a state of maximum activity when on-stream.

Reactivation of the catalyst is accomplished with hydrogen, under pressure, and at high temperatures, for example, temperatures about those used in the process, or in view of the exothermic nature of the reactivation, somewhat lower temperatures. We have found that through the use of hydrogen at these high temperatures and pressures for the reactivation, the reactivation can be satisfactorily carried out in a sufficiently short period of time so that the reactivated catalyst may be put on-stream before the catalyst in the other reactor loses activity to any substantial extent.

Reactivation under these conditions apparently involves hydrogenation or hydrogenalysis of complex tars which are deposited on the catalyst during the on-stream period, resulting in the production of hydrocarbon, largely methane, and ammonia. The ammonia cannot be accounted for by adsorbed ammonia or by ammonia retained in the pores or interstices of the catalyst or the free space around the catalyst, because even if the reaction chamber be thoroughly purged by nitrogen to displace any ammonia in the chamber, substantial quantities of ammonia are produced during the reactivation.

Similarly, the reactivation does not seem to involve any reaction of the type involved in the production of the fresh catalyst. The fresh catalyst is produced by the reduction of cobalt oxide, or cobalt oxide-hydroxide or carbonate complexes resulting from the calcining of cobalt precipitated from a solution of one of its soluble salts on a carrier by the action of alkali or carbonated alkali. That reduction results in the production of water and metallic cobalt or a lower cobalt oxide or a mixture or complex of the metal and one or more of its oxides, and perhaps hydroxides. The hydrogenation or hydrogenalysis involved in the reactivation, on the contrary, does not result in the production of much water, but it does result in the production of substantial quantities of hydrocarbon and ammonia and does effectively remove the tarry or carbonaceous deposit from the catalyst.

In carrying out the continuous process, it is important to avoid at any time introducing hydrocarbon into the catalyst chamber in the absence of ammonia, usually in large excess, because of the fact that the catalyst is an active cracking catalyst. Also, it is necessary to avoid at all times the introduction of air or other oxidizing gases, even if the catalyst is cool, because the catalyst is strongly pyrophoric. Sudden exposure of the catalyst to air, for example, results in immediate oxidation with an uncontrolled rise in temperature which may even be sufficiently great to cause the catalyst to sinter and become worthless. If at any time it is necessary to remove the catalyst from the reaction chamber, with exposure of it to air, it is necessary to stabilize the catalyst, e. g., by slowly admitting very small quantities of air or oxygen greatly diluted with nitrogen or other inert gas, so that the oxidation incident to the pyrophoric nature of the catalyst takes place very slowly, and any undue rise in temperature which would cause permanent damage to the catalyst is avoided.

The rate at which reactivation of the catalyst takes place, is a function of both temperature and the pressure, and it is only through the use of temperatures which equal or approach reaction temperatures and relatively high hydrogen pressures, for example, in excess of 1000 lbs. per square inch, and advantageously much higher, such as 3000 lbs. per square inch, that effective reactivation can be accomplished within the period during which the on-stream catalyst retains its high or approximately maximum activity. For this reason, if the operation is to be made substantially continuous through the use of but two reactors having alternating on-stream periods, and the advantages obtainable through the practice of the invention fully realized, it is necessary that reactivation be carried out at high temperatures and pressures. The reactivation involves exothermic reactions, and for that reason the temperature used can be somewhat lower than that used in the processing.

At the end of the reactivation, it is important to purge the hydrogen from the reaction chamber, as by the use of ammonia, or some inert gas, to prevent hydrogenation of hydrocarbon feed to the reaction chamber when it is put on-stream with the production of a mixture of ammonia and saturated hydrocarbon which would not be susceptible of the amination reaction but which may have a hydrocarbon component capable of being cracked with the possibility of causing an undue rise in temperature or more probably the deposition of a hydrocarbon derived coke or tar on the catalyst which cannot be removed by reactivation and which if present in any considerable quantity so impairs the catalyst as to make it economically useless.

The invention will be further illustrated in connection with the appended drawing which illustrates diagrammatically an arrangement of two reactors which may be used in carrying out the invention.

In the drawing there are shown two reactors A and B arranged in parallel and adapted to be operated alternately. Each consists of an elongated vertical vessel of adequate strength containing the catalyst, for example, a pelleted catalyst such as is described in application Serial No. 489,087, filed May 29, 1943. Feed is supplied to the reactor A through the line C controlled by the valves 1 and 2 and to reactor B through the line D controlled by the valves 3 and 4, the feed being a suitably preheated mixture containing the ammonia and olefin and which may contain saturated hydrocarbons or the like, such as a P P cracking stock containing around 35 to 60% propylene, 35 to 60% propane, with about 5% of lighter and heavier hydrocarbons, and about 5 to 10 mols of ammonia for each mol of propylene. The pressure within the reactor which is on-stream is controlled by an automatic valve leading to a product stabilizer, and advantageously will be about 1000 to 3000 lbs. per square inch, say 1500 lbs. per square inch. The reaction temperature, for the mixture specifically described above, will advantageously be about 640–650° F.

Reactor A discharges through the line E and reactor B through the line F. At a time when reactor A is on-stream and reactivation of the catalyst in reactor B is in course of being reactivated valves 1, 2, 7, 8 are open and all other valves leading to or from reactor A are closed.

When the catalyst in reactor B has been reactivated and purged with ammonia and reactor B is to be placed on-stream and reactor A subjected to catalyst reactivation, pressure is equalized between the two reactors by opening valves 3 and 4 while the supply of ammonia and hydrocarbon feed is continued. The pressure in the two reactors will become equalized at some value below the normal on-stream pressure, say at 1000 lbs. if the normal operating pressure is 1500 lbs. Reactor B is then brought up to operating pressure by closing valves 1, 2 and 12.

and opening valves 10 and 11. As soon as the pressure within the reactor B reaches normal operating pressure, the automatic control valve in the line G will open to permit the product to pass to the stabilizer. Valves 7 and 8 are then closed and valve 9 opened. Reactor A is thus cut off from both the feed and the normal product discharge. Its pressure is reduced by opening the valves 17, 18 and 13, the gas which it contains thus being directed to a gas holder, advantageously maintained at the pressure of the product stabilizer overhead so that its content of both product and unreacted feed may be recovered. In ordinary operation, this discharge may be to about 100 lbs. pressure. When the pressure in reactor A reaches this valve, and there is no further discharge to the gas holder, valve 13 is closed and valve 14 opened, so that the pressure within reactor A is reduced to atmospheric pressure. Valves 17 and 18 are then closed and reactivation begun by the admission of preheated hydrogen, at a high temperature, e. g., 600–650° F., to reactor A by opening valves 22, 25 and 27. When the hydrogen pressure reaches the desired level, 3000 lbs. per square inch, valve 5 is cracked open to permit a slow flow of hydrogen. At the end of the reactivation period, valve 25 is closed and valve 5 opened, so the pressure within reactor A drops to atmospheric. The reactor is then purged with ammonia by closing valve 25 and opening valves 23 and 28. When sufficient ammonia has been passed through the reactor to purge it of hydrogen, valves 22, 23 and 28 are closed, valve 5 is closed, valve 19 is opened. Reactivation and purging are then complete and reactor A is ready to be placed on-stream and reactor B to be reactivated, the process being substantially the same except that it involves the corresponding series of valves controlling the lines supplying reactor B.

For a typical operation involving the amination of propylene at temperatures around 640 to 650° F. and pressures of 1500 lbs., with a cobalt catalyst, the on-stream period of each reactor may be about 6 hours, with the reactivation period about the same, of which the largest portion will involve actual reactivation by hydrogen at high temperatures and pressures, and a minor portion will involve the release of pressure from equilibrium pressure to atmospheric pressure before admission of hydrogen and the ammonia purge after reactivation is complete to insure the absence of hydrogen in the reaction vessel at the start of the on-stream period. Thus the actual period of passage of the hydrogen through the reactor may be about four hours.

I claim:

1. In a process for producing nitriles and amines by the direct reaction of ammonia with olefins in the presence of a catalyst comprising reduced cobalt oxide which selectively favors the amination reaction, the improvement which includes passing a feed stream containing ammonia and olefin, with the ammonia present in large excess, through a first bed of said catalyst under reaction conditions including an elevated temperature and a pressure approximating 1000–3000 pounds per square inch for a substantial period, stopping the supply of reactants to said first bed of catalyst by diverting the feed stream to pass through a second bed of said catalyst, reactivating the catalyst in said first bed by passing hydrogen therethrough at an elevated temperature, stopping the supply of feed to said second bed by diverting the feed stream to the first bed, reactivating the catalyst in said second bed by passing hydrogen therethrough at an elevated temperature, and purging each catalyst bed with ammonia after each reactivation and before the feed stream is again passed therethrough.

2. The process as in claim 1, in which the feed stream is uninterrupted, and in which the pressure is equalized between the two catalyst beds by bringing both into free and open communication with each other and with the feed stream at the time the feed stream is diverted from one catalyst bed to the other.

JOHN W. TETER.

REFERENCES CITED

The following references are of record in the file of this patent:

UNITED STATES PATENTS

| Number | Name | Date |
|---|---|---|
| 1,492,194 | Beindl | Apr. 29, 1924 |
| 1,920,795 | Jaeger | Aug. 1, 1933 |

OTHER REFERENCES

Berkman, et al., "Catalysis" (Reinhold Publ. Co.) 1940, pp. 294–306, 1014, 1025, 1032.